US010794654B2

(12) United States Patent
Burton

(10) Patent No.: US 10,794,654 B2
(45) Date of Patent: Oct. 6, 2020

(54) UNIVERSAL PINTLE MOUNT FOR A WEAPON

(71) Applicant: Thomas Burton, Oak Hill, WV (US)

(72) Inventor: Thomas Burton, Oak Hill, WV (US)

(*) Notice: Subject to any disclaimer, the term of this patent is extended or adjusted under 35 U.S.C. 154(b) by 155 days.

(21) Appl. No.: 15/968,642

(22) Filed: May 1, 2018

(65) Prior Publication Data
US 2019/0339037 A1 Nov. 7, 2019

(51) Int. Cl.
F41A 23/00 (2006.01)
F41A 23/06 (2006.01)
F16B 2/18 (2006.01)

(52) U.S. Cl.
CPC .............. F41A 23/06 (2013.01); F16B 2/185 (2013.01)

(58) Field of Classification Search
CPC ........ F41A 23/06; F41G 11/001; F41G 11/004
USPC ....... 248/229.1, 229.11, 229.13, 230.4; 42/94
See application file for complete search history.

(56) References Cited

U.S. PATENT DOCUMENTS

| 2,409,618 | A | * | 10/1946 | Evans ................... F41A 27/16 89/37.03 |
| 4,913,391 | A | | 4/1990 | Klipp |
| 5,275,364 | A | | 1/1994 | Burger et al. |
| 5,347,740 | A | | 9/1994 | Rather et al. |
| 5,476,241 | A | | 12/1995 | Helman |
| 5,481,817 | A | | 1/1996 | Parker |
| 5,497,214 | A | | 3/1996 | Labree |
| 5,589,903 | A | | 12/1996 | Speggiorin |
| 5,711,103 | A | * | 1/1998 | Keng ..................... F41A 23/08 42/94 |
| 5,988,694 | A | | 11/1999 | Brushaber |
| 6,032,911 | A | | 3/2000 | Osborne |
| 6,209,835 | B1 | | 4/2001 | Walrath et al. |
| 6,283,428 | B1 | | 9/2001 | Maples et al. |
| 6,315,256 | B1 | | 11/2001 | Tolar |
| 7,562,484 | B2 | | 7/2009 | Kim |
| 7,565,762 | B2 | | 7/2009 | Lackey |
| 7,770,319 | B2 | | 8/2010 | Mcdonald |
| 8,578,644 | B1 | | 11/2013 | Oquin et al. |
| 8,757,044 | B2 | | 6/2014 | Hagedorn et al. |
| 9,296,343 | B2 | * | 3/2016 | MacGillivray ......... B60R 11/06 |
| 9,417,025 | B1 | | 8/2016 | Mcdonald |

(Continued)

OTHER PUBLICATIONS

PCT, "International Search Report and Written Opinion", Application No. PCT/US2019/030264, dated Aug. 13, 2019, 9 pages.

(Continued)

Primary Examiner — Steven M Marsh
(74) Attorney, Agent, or Firm — Dorsey & Whitney LLP

(57) ABSTRACT

An apparatus for mounting a weapon to a support structure comprising a pintle assembly including a slide block; a pintle coupled to the slide block; a pintle lever with a handle and a rod rotatably coupled to the slide block; and a clamp assembly including a fixed jaw having a first end and a second end forming at least one knuckle; a moveable jaw having a first end and a second end forming a pin; and a clamp lever that releasably couples the first end of the fixed jaw with the first end of the moveable jaw; wherein the pin of the moveable jaw is rotatably coupled to the at least one knuckle of the fixed jaw; the pintle lever is rotatably coupled to the fixed jaw of the clamp assembly; and the pintle assembly and the clamp assembly are rotatably and releasably coupled to each other.

15 Claims, 9 Drawing Sheets

(56) References Cited

U.S. PATENT DOCUMENTS

| | | | |
|---|---|---|---|
| 10,473,143 B2* | 11/2019 | Basiliere | F16C 1/12 |
| 2006/0117941 A1 | 6/2006 | Pacuska | |
| 2008/0092732 A1 | 4/2008 | Becker et al. | |
| 2012/0227305 A1 | 9/2012 | Fontenot et al. | |
| 2013/0160345 A1* | 6/2013 | Li | F41G 11/001 |
| | | | 42/124 |
| 2016/0298922 A1 | 10/2016 | Duncan et al. | |
| 2018/0094892 A1 | 4/2018 | Bowe et al. | |

OTHER PUBLICATIONS

"Machine Gun Mounts" Military Systems Group, 2017 (6 pages).
"Mk64 Gun Mount," Keyword Search, Website (2 pages).

* cited by examiner

UNIVERSAL PINTLE MOUNT FOR A WEAPON

TECHNICAL FIELD

The technology described herein relates to a universal pintle mount for a weapon.

BACKGROUND

Present systems and devices for mounting weapons to vehicles or other structures are limited. Many are designed to fit within or mount to a specific vehicle or structure. In addition, many of these mounting systems and devices are effectively permanently fixed in a particular position or orientation. While they may be removable, it takes considerable time and effort to relocate and remount the weapon mount to another location on a vehicle or other structure. Inability to quickly and simply reposition a mounting system on a vehicle or other structure may put personnel at a disadvantage and risk significant physical harm. Therefore, it may be desirable to have an apparatus that is configured to mount a weapon to a variety of support structures in a variety of orientations.

The information included in this Background section of the specification, including any references cited herein and any description or discussion thereof, is included for technical reference purposed only and is not to be regarded subject matter by which the scope of the disclosure as defined in the claims is to be bound.

SUMMARY

When mounting a weapon to a vehicle or other structure, it may be desirable to provide a mount system that allows the weapon to be oriented in a variety of directions, such as forward, either lateral side, or rearward. In some situations, it may be desirable to quickly move or readjust a weapon to provide an alternate orientation or direction for discharge or to accommodate cargo or personnel in the vehicle that might interfere with a fixed mounting location. Quick and simple repositioning of the mount system or apparatus and associated weapon may be desirable to help personnel set up in an alternate location or direction to more quickly discharge the weapon toward a desired target.

In one implementation, an apparatus for mounting a weapon to a support structure, includes a clamp assembly configured to releasably couple the apparatus with the support structure, and a pintle assembly configured to releasably couple the apparatus with the weapon, the pintle assembly including a pintle or pintle mount, a pintle lever with a handle and a rod, and a slide block coupled to the pintle. The clamp assembly may be configured to releasably couple the apparatus to the support structure, the clamp assembly including a fixed jaw having a first end, a central section, and a second end, the second end forming at least one knuckle, and a moveable jaw having a first end and a second end, the second end forming a pin. The pin of the moveable jaw may be rotatably coupled to the at least one knuckle of the fixed jaw. The pintle lever may be rotatably coupled to the fixed jaw of the clamp assembly. The pintle assembly and the clamp assembly may be rotatably and releasably coupled to each other. The pintle may be configured to mate with a feature of a weapon to releasably couple the pintle with the weapon.

In some implementations, the clamp assembly may further include a clamp lever that releasably couples the first end of the fixed jaw with the first end of the moveable jaw. In some implementations, the clamp lever is rotatably coupled to the first end of the fixed jaw. The clamp lever may include a clamp lever handle, a rod, and a pin threadably engaged with the rod, wherein the pin is configured to be rotatably coupled with the first end of the fixed jaw.

In some implementations, the first end of the fixed jaw may include at least one boss configured to rotatably or pivotably couple with a pin of the clamp lever. The central section of the fixed jaw of the clamp assembly may include an engagement section that is complementary in shape to a feature of the slide block of the pintle assembly. The fixed jaw of the clamp assembly may further include a splined face configured to engage with a splined face of the slide block and restrict the rotation of the slide block when the clamp assembly is assembled with the slide block in a secured position. In some implementations, the fixed jaw of the clamp assembly includes a bore hole extending through the central section, and a portion of the rod of the pintle lever extends through the bore hole. The portion of the rod of the pintle lever that extends through the bore hole of the fixed jaw may be threaded.

In some implementations, when the pintle assembly is in a secured position, the engagement of the pintle lever rod with the slide block may compress the slide block between the pintle lever handle and the fixed jaw. When the pintle assembly is in an unsecured position, the engagement of the pintle lever rod with the slide block may allow the slide block to move freely between the pintle lever handle and the fixed jaw. In the unsecured position, the slide block and fixed jaw may be rotated with respect to each other. In the unsecured position, the slide block may be linearly adjusted toward and away from the fixed jaw.

In some implementations, the splined face of the fixed jaw may be generally normal to a bore hole extending through the central section of the fixed jaw. The slide block may further include a bore hole extending through a body of the slide block which the rod of the pintle lever extends through and the slide block lever is adjustably and slidably positioned about the rod of the pintle lever. The slide block may include at least one threaded hole configured to allow an accessory to be detachably coupled to the slide block.

In some implementations, an apparatus for mounting a weapon to a vehicle may include a pintle assembly configured to releasably couple the apparatus with the weapon, the pintle assembly including a pintle, a pintle lever with a handle and a rod, and a slide block coupled to the pintle, the slide block have a splined face. The apparatus may also include a clamp assembly configured to releasably couple the apparatus to the vehicle. The clamp assembly may include a fixed jaw having at least one knuckle and a splined face, and a moveable jaw having a pin, wherein the pin of the moveable jaw is rotatably coupled to the at least one knuckle of the fixed jaw. The pintle assembly and the clamp assembly may be rotatably and releasably coupled to each other at the slide block splined face and the fixed jaw splined face.

In some implementations, a method of preparing to secure a weapon to a support structure may include engaging a clamp assembly to the support structure; moving a clamp lever to couple a moveable jaw of the clamp assembly to a fixed jaw of the clamp assembly; securing the clamp assembly to the support structure; positioning a slide block of a pintle assembly in an unsecured position; rotating a pintle lever handle of the pintle assembly; and securing the slide block of the pintle assembly to the fixed jaw of the clamp assembly.

The method may also include securing a weapon to the pintle of the pintle assembly. The method may also include rotating the moveable jaw with respect to the fixed jaw before engaging the clamp assembly to the object. The step of moving a clamp lever may include rotating a clamp lever having a handle, rod, and pin, the pin coupled to the fixed jaw. The step of moving a clamp lever may include positioning the clamp lever rod within a slot formed in the moveable jaw. The step of securing the clamp assembly may include rotating a handle of a clamp lever and compressing the fixed jaw and the moveable jaw together about the object. The step of securing the slide block of the pintle assembly to the fixed jaw of the clamp assembly may include engaging a splined face of the slide block with a splined face of the fixed jaw. The step of securing the slide block may include compressing the slide block between the pintle lever handle and the fixed jaw.

This Summary is provided to introduce a selection of concepts in a simplified form that are further described below in the Detailed Description. This Summary is not intended to identify key features or essential features of the claimed subject matter, nor is it to be used to limit the scope of the claimed subject matter. A more extensive presentation of features, details, utilities, and advantages of the present disclosure as defined in the claims is provided in the following written description of various embodiments of the disclosure and illustrated in the accompanying drawings.

DETAILED DESCRIPTION

Figure 1:
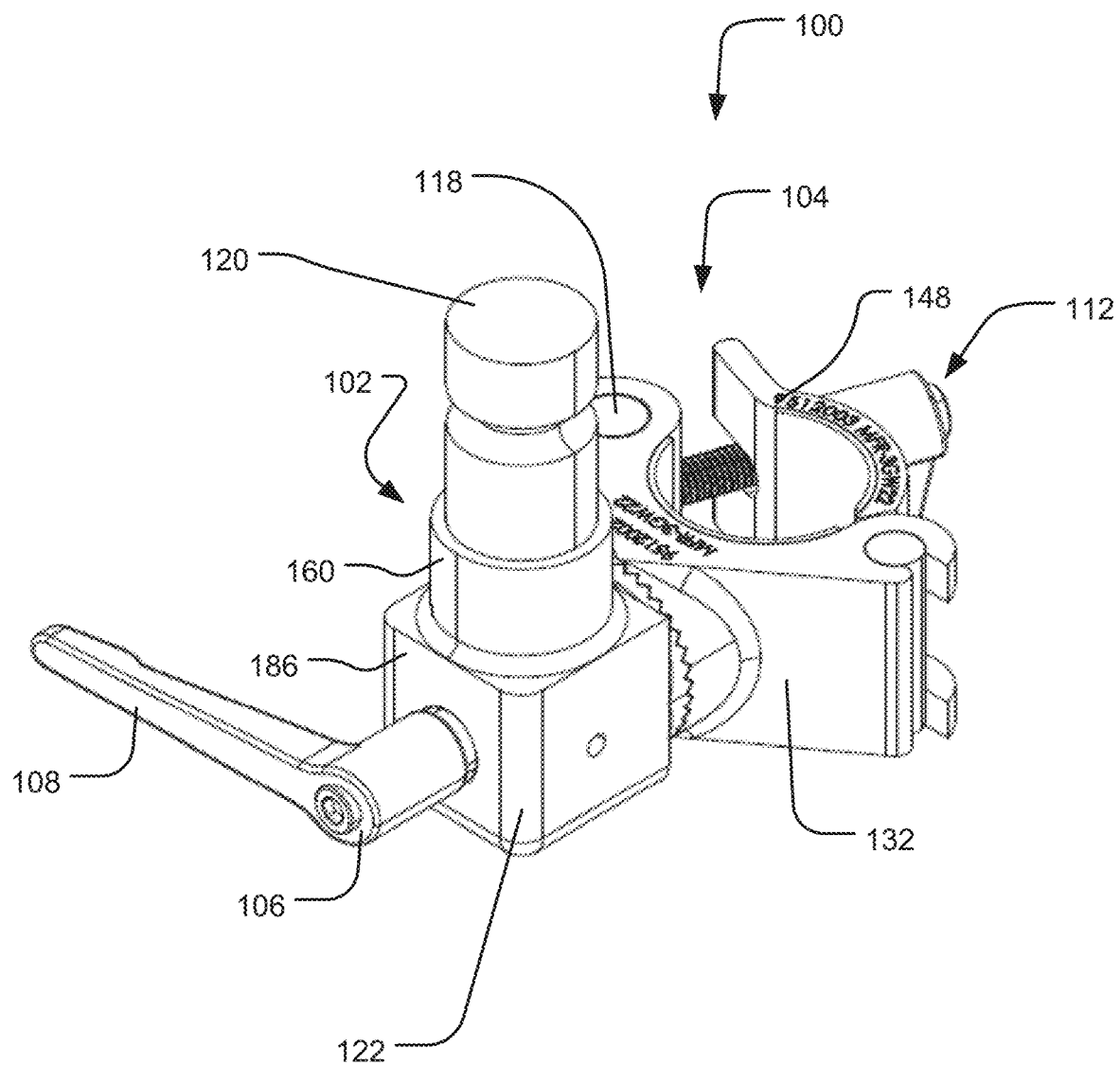
FIG. 1 is a front isometric view of an apparatus for mounting a weapon to a support structure.
Figure 2:
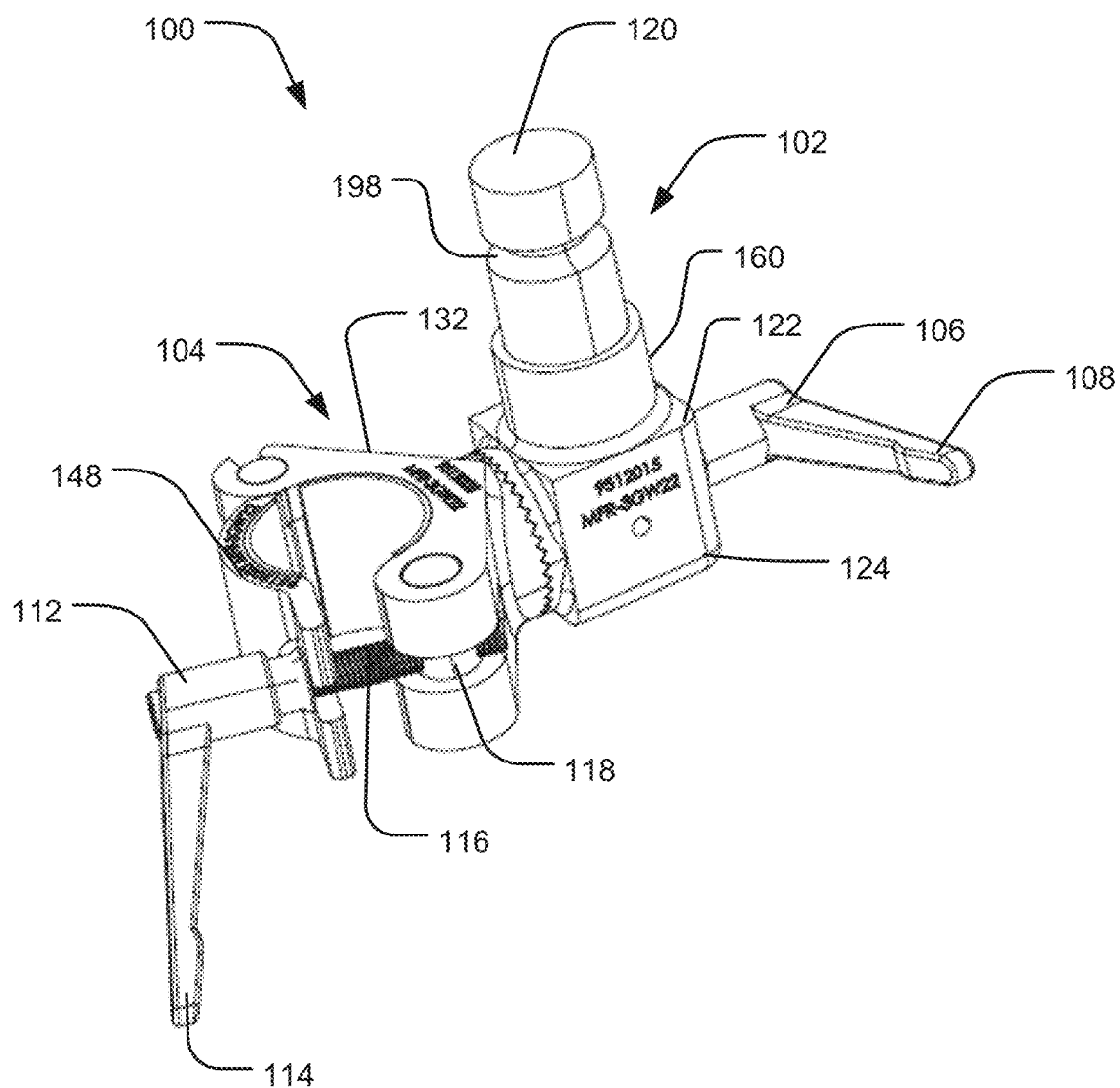
FIG. 2 is a rear isometric view of the apparatus of FIG. 1.

Various embodiments of an apparatus for mounting a weapon to a support structure are disclosed herein. The apparatus is configured for selective attachment to a structure (e.g., a land, water, or air vehicle roll bar, a vehicle frame structure, a vehicle accessory mount, or other structure). The apparatus may include a clamp assembly and a pintle assembly. The clamp assembly may be used to secure the apparatus to the structure. The pintle assembly may be used to releasably couple the apparatus with the weapon. The pintle assembly may be rotatably and releasably coupled to the clamp assembly. The pintle assembly may include a slide block with a splined face. The clamp assembly may include a fixed clamp with a splined face. The engagement of the splined face of the clamp assembly with the splined face of the pintle assembly may restrict the rotation of the pintle assembly with respect to the structure when the apparatus is assembled in a secured position.

FIGS. 1-6 depict an embodiment of an apparatus 100 for mounting a weapon to a support structure. The apparatus 100 may include a clamp assembly 104 and a pintle assembly 102. The primary components of the clamp assembly 104 may include a clamp lever 112 with a clamp lever pin 118, a fixed jaw 132, and a moveable jaw 148. The primary components of the pintle assembly 102 may include a pintle lever 106, a slide block 122, and a pintle 120. The pintle lever 106 may be used to reversibly couple the slide block 122 of the pintle assembly 102 to the fixed jaw 132 of the clamp assembly 104. The clamp lever 112 may be used to reversibly couple ends of the fixed jaw 132 and the moveable jaw 148 together so that the clamp assembly 104 may be positioned about a support structure. The pintle 120 of the pintle assembly 102 may be used to mate with a feature of a weapon, or a receiving connector mounted to a weapon, to releasably couple the weapon to the pintle 120.

Details of the pintle assembly 102 are shown in FIGS. 1-6 and 13. In some examples, the pintle assembly 102 includes the pintle lever 106, the slide block 122, and the pintle 120. The pintle lever 106 may include a pintle lever handle 108 coupled to a pintle lever rod 110. In some examples, at least a portion of the pintle lever rod 110 is threaded. In some examples, the pintle lever rod 110 is secured to the pintle lever handle 108 via a threaded engagement. In order to prevent the pintle lever rod 110 from rotating with respect to the pintle lever handle 108 once engaged therewith, a thread lock or other adhesive, chemical welding, ultrasonic welding, metal welding, or other methods may be used to fix or the two components together.

As shown in FIGS. 3-6, the slide block 122 may have a body 124 that is square or rectangular shaped with a top end and a bottom end, and a socket 160 positioned adjacent to the top end of the body 124. The socket 160 may define a cylindrical recess 184 or blind hole that extends within the socket 160 and at least partially into the body 124. The shape of the aperture 184 may be similar to that of the pintle 120. As note, in some examples, the socket 160 may be cylindrically shaped to receive a portion of the cylindrically-shaped pintle 120 when positioned within the socket 160. In some examples, the recess 184 within the socket 160 may be shaped as a triangle, square, hexagon, or other shape, and a base portion of the pintle 120 may be complementary in shape. In some examples, the base portion of the pintle 120 is permanently fixed to the slide block 122 within the socket 160 via welding, adhesive, or other coupling technique.

Figure 5:
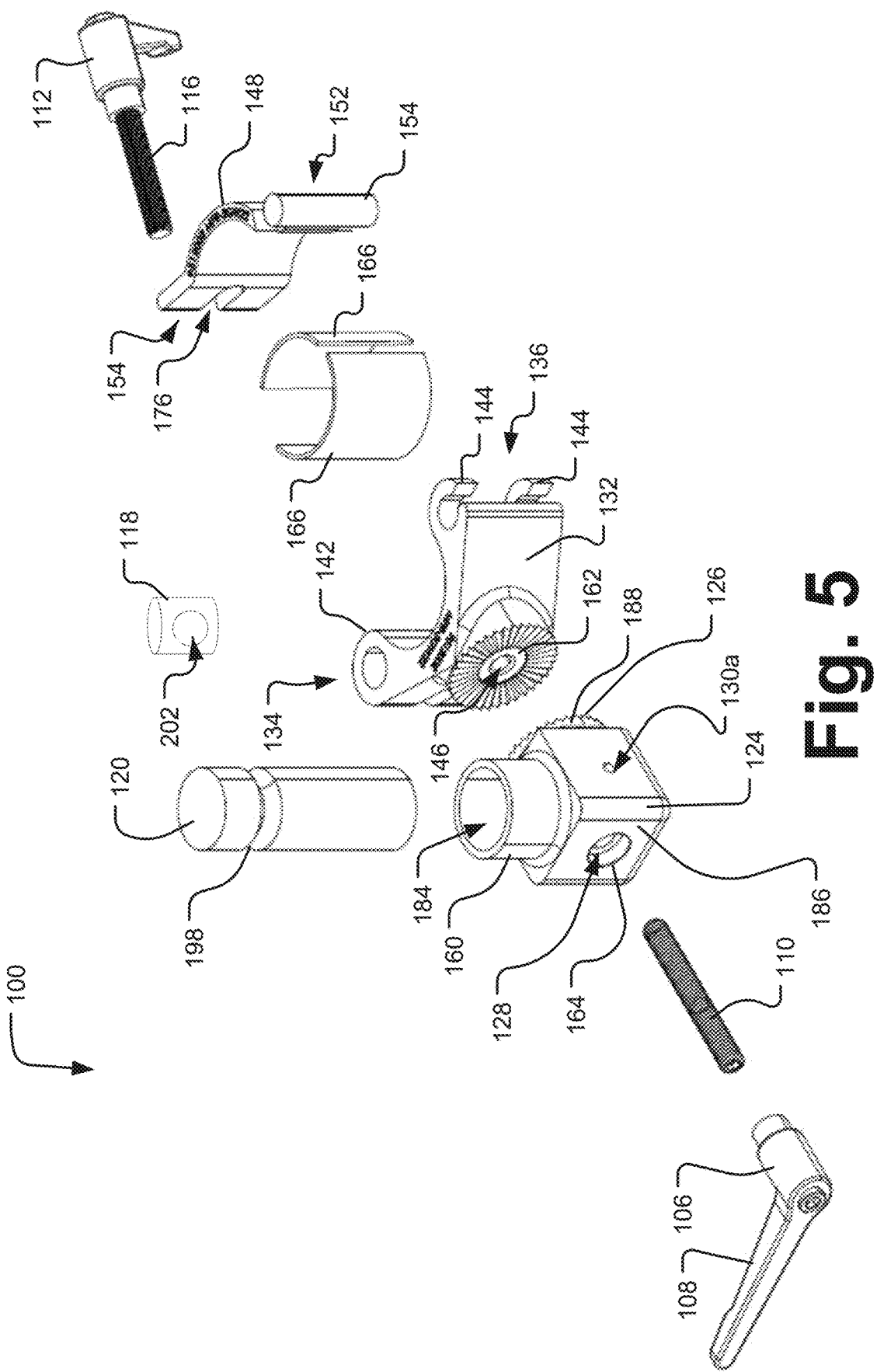
FIG. 5 is an exploded front isometric view of the apparatus of FIG. 1.
Figure 6:
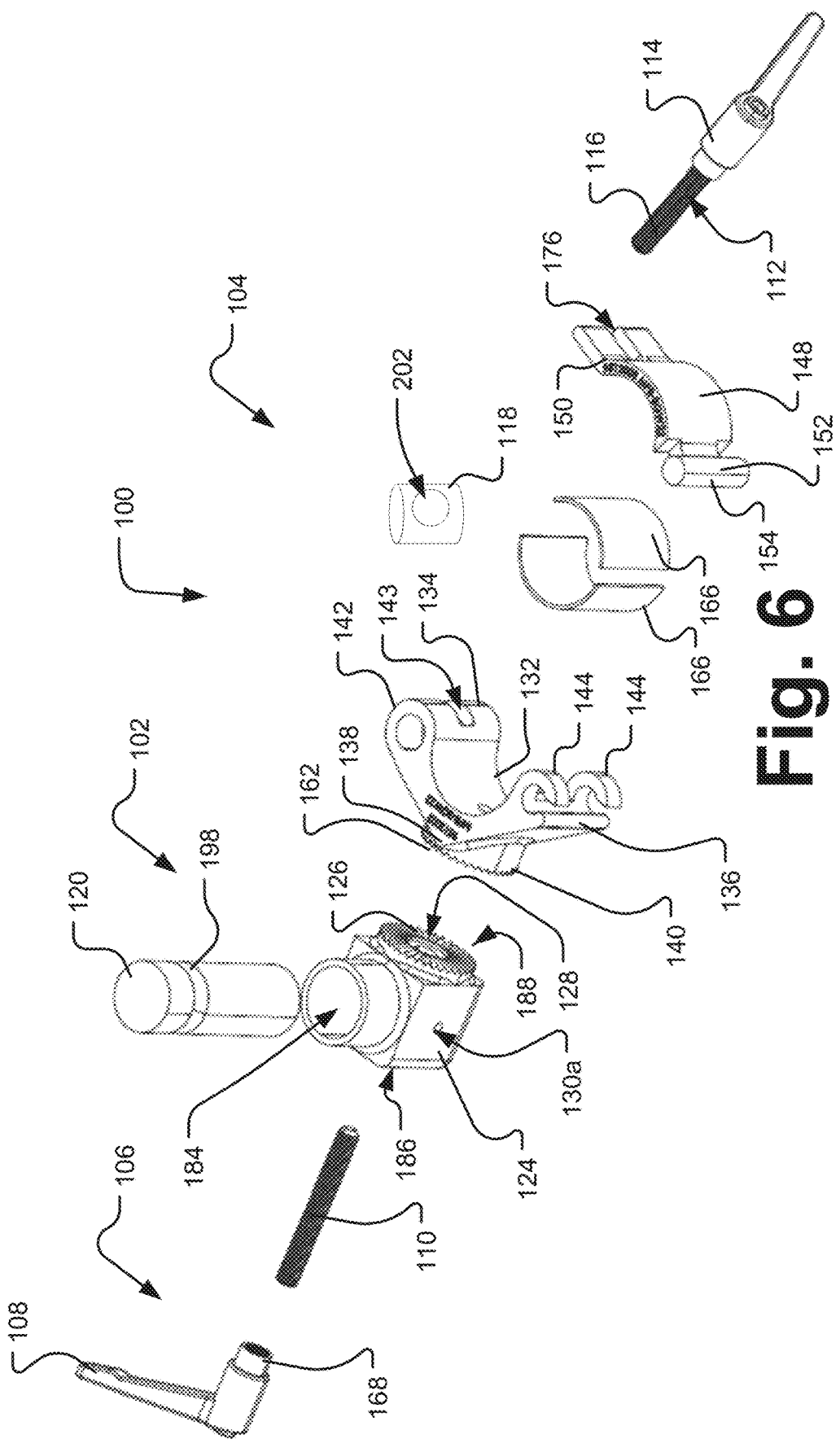
FIG. 6 is an exploded rear isometric view of the apparatus of FIG. 1.

As shown in FIGS. 5 and 6, the body 124 of the slide block 122 may include a pintle lever engagement face 186 and a clamp assembly engagement face 188. A bore hole 128 may extend through the body 124 between the pintle lever engagement face 186 and the clamp assembly engagement face 188. In some examples, the bore hole 128 may have a central axis that is generally normal to the pintle lever engagement face 186 and the clamp assembly engagement face 188. As shown in FIG. 5, in some embodiments, the pintle lever engagement face 186 includes a countersink 164 that extends into the body 124. As shown in FIG. 6, the clamp assembly engagement face 188 may include a splined face 126 with radially extending splines. The radially extending splines may be generally normal to the axis of the bore hole 128. In some examples, the clamp assembly engagement face 188 may also include a countersink that extends into the body 124.

Figure 3:
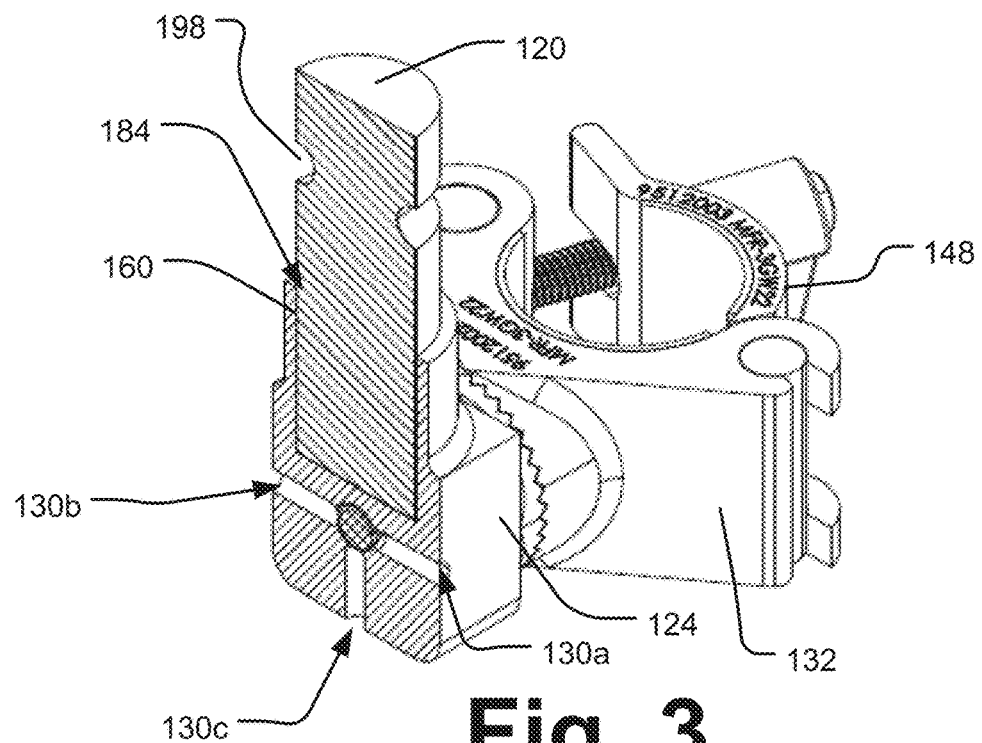
FIG. 3 is a front isometric view in cross-section along line 3-3 of the apparatus of FIG. 1.
Figure 4:
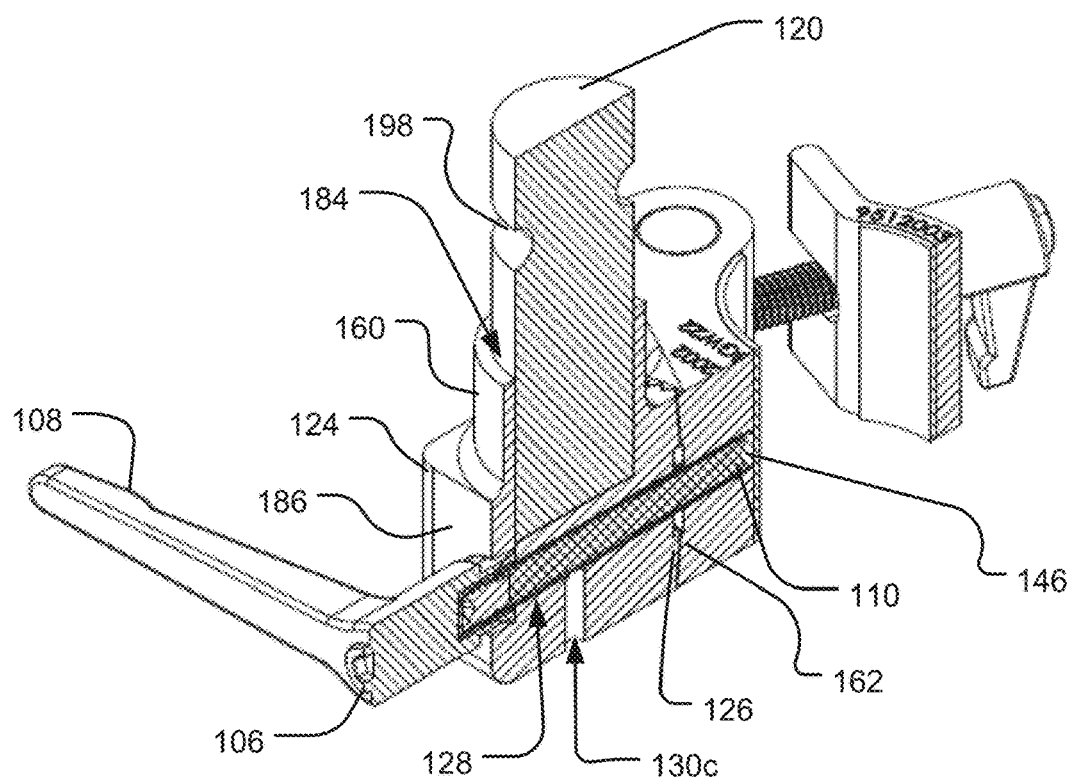
FIG. 4 is a front isometric view in cross-section along line 4-4 of the apparatus of FIG. 1.

As shown in FIGS. 3 and 4, the body 124 of the slide block 122 may also include threaded holes 130a, 130b, 130c. In some examples, the axes of the threaded holes 130a, 130b, 130c may be generally normal to the bore hole 128. In some examples, the axis of the threaded hole 130c may be generally normal to the axes of the threaded holes 130a, 130b. In some examples, the threaded holes 130a, 130b, 130c may intersect with the bore hole 128. In some examples, the threaded holes 130a, 130b, 130c may be used to threadably and detachably couple an accessory or a mount for an accessory to the body 124 of the slide block 122. In some examples, the accessory may be a camera, speaker, smart phone, or the like.

As shown in FIG. 3, the pintle 120 may be generally cylindrical in shape with a generally constant diameter. In some examples, a portion of the pintle 120 may be shaped as a triangle, square, hexagon, or other shape that is complementary in shape to the socket 160. Opposing ends of the pintle 120 may be flat. In some examples, the pintle 120 may include a weapon coupling feature 198. In some examples, the weapon coupling feature 198 is an annular groove that extends around a circumference of the pintle 120. In some examples the weapon coupling feature 198 is used to help couple a weapon to the pintle 120 and thereby to the apparatus 100. In some examples, the weapon coupling feature 198 is configured to interface with a receptacle of a weapon mount coupled to a weapon and retained therein by a retaining pin. The retaining pin may be used to couple, secure, or hold the weapon mount with the pintle 120 by interfacing with the annular groove forming the weapon coupling feature 198 while still allowing the weapon and weapon mount to rotate about the pintle 120.

Figure 7:
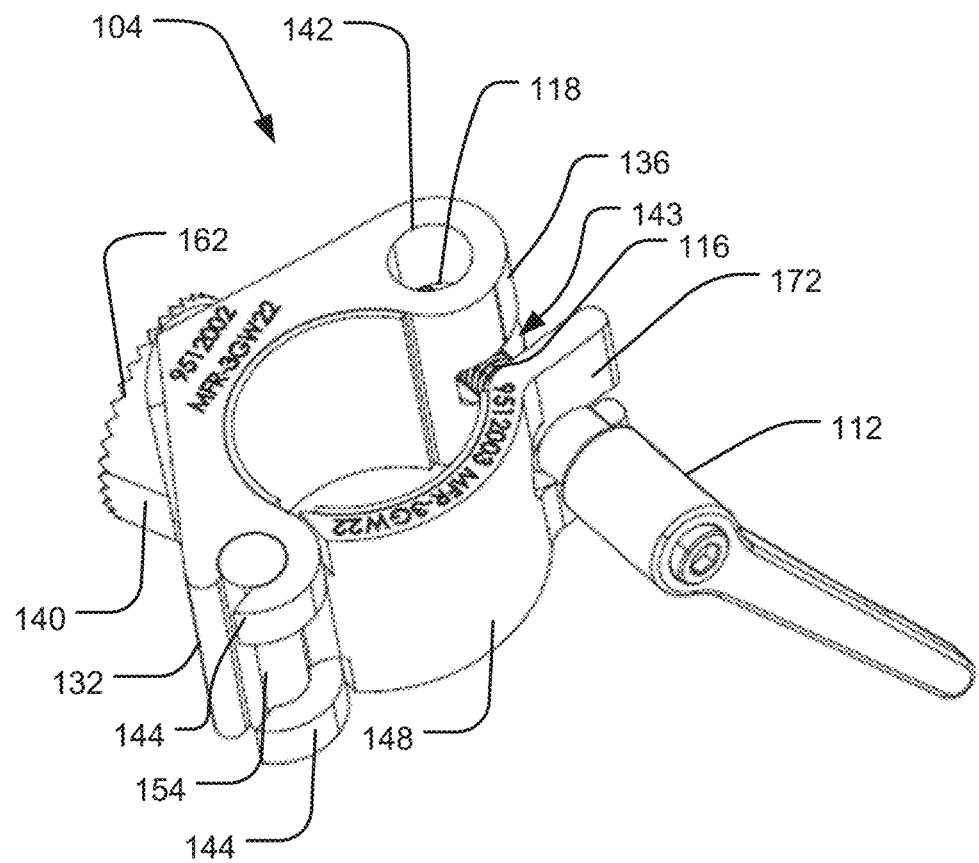
FIG. 7 is a rear isometric view of a clamp assembly of the apparatus of FIG. 1.
Figure 8:
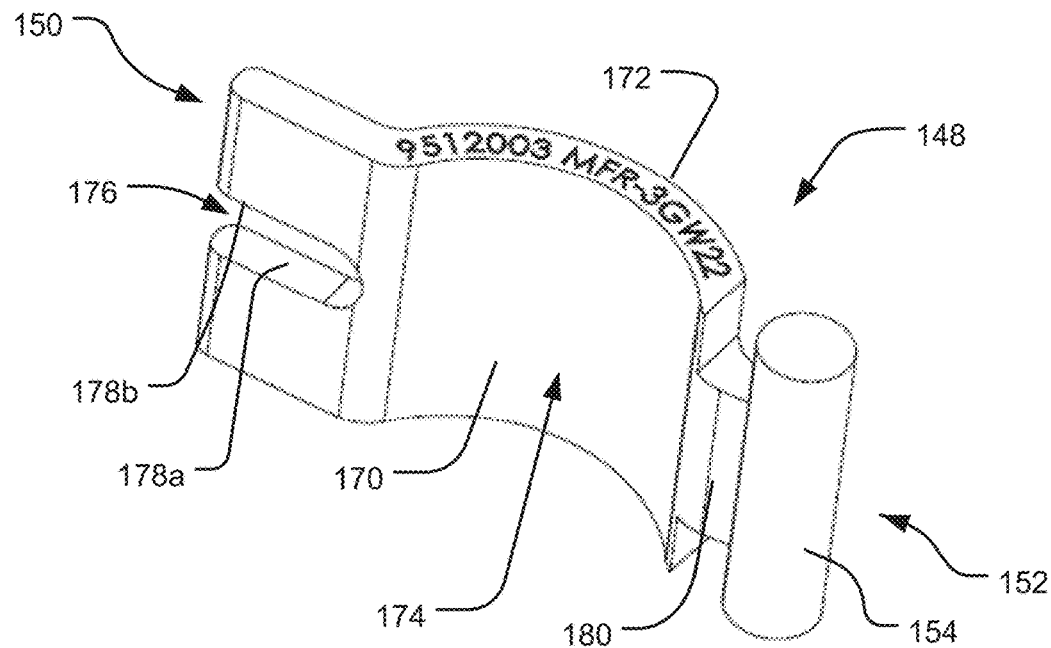
FIG. 8 is a front isometric view of a moveable jaw of the clamp assembly of FIG. 7.

Details of the clamp assembly 104 are shown in FIGS. 1-11. In some examples, as shown in FIG. 7, the clamp assembly 104 may include a fixed jaw 132, a moveable jaw 148, and a clamp lever 112. FIG. 8 shows details of the moveable jaw 148. The moveable jaw 148 may include a central section 174 positioned between a first end 150 and a second end 152. The first end 150 may be forked with an open end that forms a slot 176 between two parallel sidewalls 178a, 178b. The slot 176 may be sized to receive the clamp lever rod 116. The central section 174 may have an inside face 170 and outside face 172. In some examples, the inside face 170 of the central section 174 may be generally concave in shape. In some examples, the generally concave shape of central section 174 may complement a shape of the support structure to which the apparatus 100 couples. In some examples, the second end 152 is formed as a pin 154. The pin 154 may be cylindrically shaped. The pin 154 may be connected to the central section 174 by a tab 180.

Figure 9:
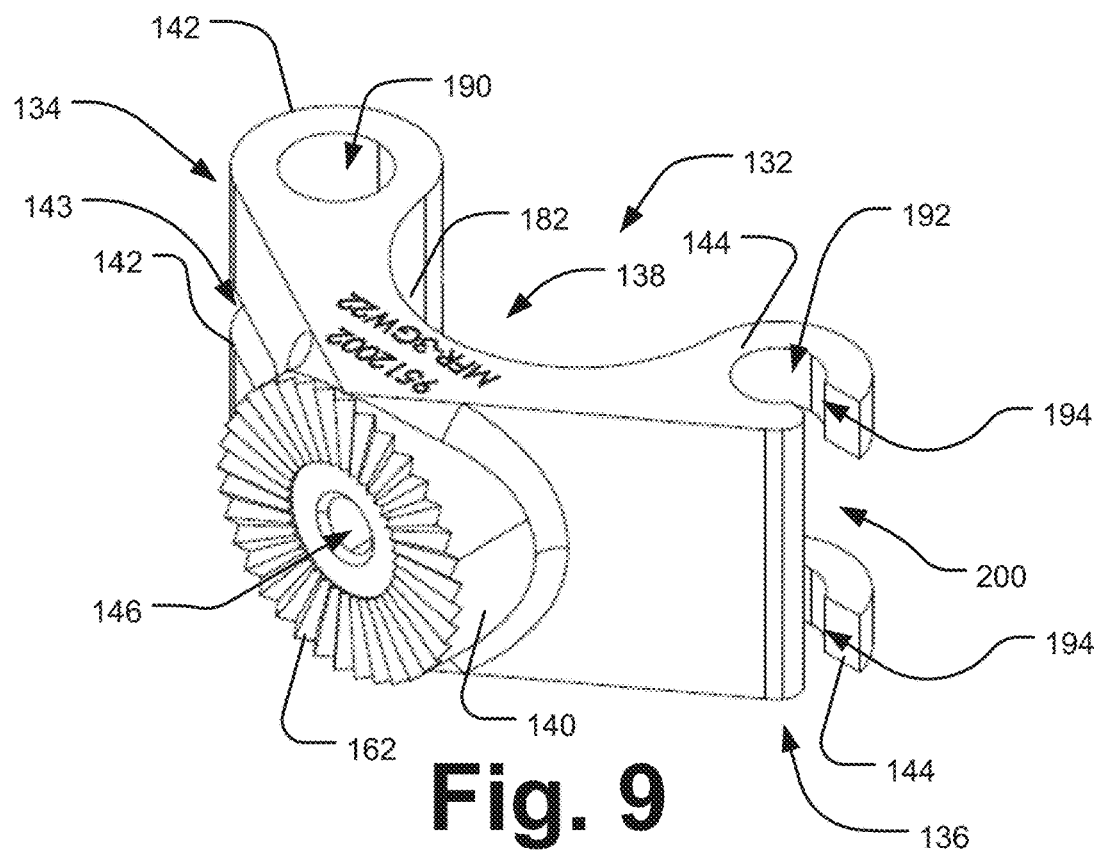
FIG. 9 is a front isometric view of a fixed jaw of the clamp assembly of FIG. 7.
Figure 10:
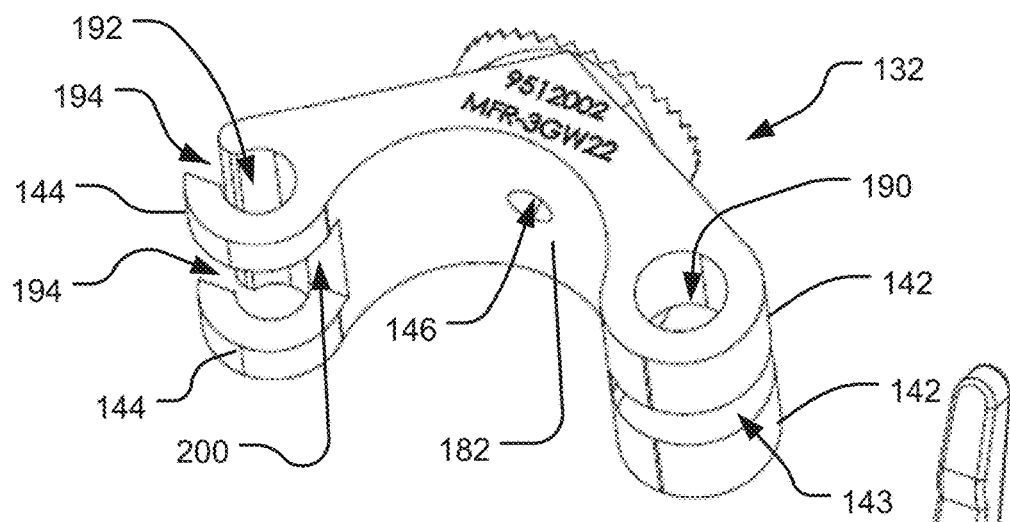
FIG. 10 is a rear isometric view of the fixed jaw of FIG. 9.

As shown in FIGS. 9 and 10, the fixed jaw 132 may include a first end 134, a second end 136, and a central section 138. The first end 134 may include multiple hinge bosses 142 that may rotatably couple with a pin 118 of the clamp lever 112. Each hinge boss 142 may define a hinge aperture 190 arranged along a common center axis. Each hinge aperture 190 may be sized to receive the clamp lever pin 118 of the clamp lever 112. In some examples, a gap 143 is formed between the hinge bosses 142. When the pin 118 of the clamp lever 112 is assembled with the fixed jaw 132, the clamp lever rod 116 may be positioned within the gap 143 so that the clamp lever 112 may be rotated with respect to the fixed jaw 132.

As shown in FIGS. 9 and 10, the second end 136 of the fixed jaw 132 may include multiple knuckles 144. Each knuckle 144 may define a knuckle aperture 192 arranged along a common center axis. The knuckle apertures 192 may be sized to receive the pin 154 of the moveable jaw 148. Each knuckle 144 may define a slot 194 between a free end of the knuckle and a lateral edge of the second end 136. The slots 194 may allow for the tab 180 of the moveable jaw 148 to slide within the slots 194 to help position the moveable jaw 148 with the fixed jaw 132. A gap 200 may formed between the inside edges of the knuckles 144. When the fixed jaw 132 and moveable jaw 148 are assembled together, the tab 180 may be initially positioned in the gap 200 between the knuckles 144.

As shown in FIGS. 9 and 10, the central section 138 of the fixed jaw 132 extends between the first end 134 and the second end 136 and may include an engagement section 140 and an inside face 182. In some examples, the inside face 182 may be generally concave shaped. In some examples, the generally concave shape of inside face 182 may complement a shape of the support structure to which the apparatus 100 is coupled.

The engagement section 140 may be opposite the inside face 182. In some examples the engagement section 140 may extend perpendicularly outward with respect to a plane formed between the first end 134 and the second end 136. In some examples, the engagement section 140 may be cylindrically shaped. A bore hole 146 may extend through the central section 138 between the inside face 182 and the engagement section 140. In some examples, the bore hole 146 is threaded and receives a threaded portion of the pintle lever rod 110. An outward surface of the engagement section 140 may be formed as a splined face 162 with radial splines extending outward from the bore hole 146. In some examples, the splined face 162 is shaped to detachably mate or align with the splined face 126 of the slide block 122 to help restrict the rotation of the slide block 122 when the clamp assembly 104 is assembled with the slide block 122 in a secured position.

Figure 11:
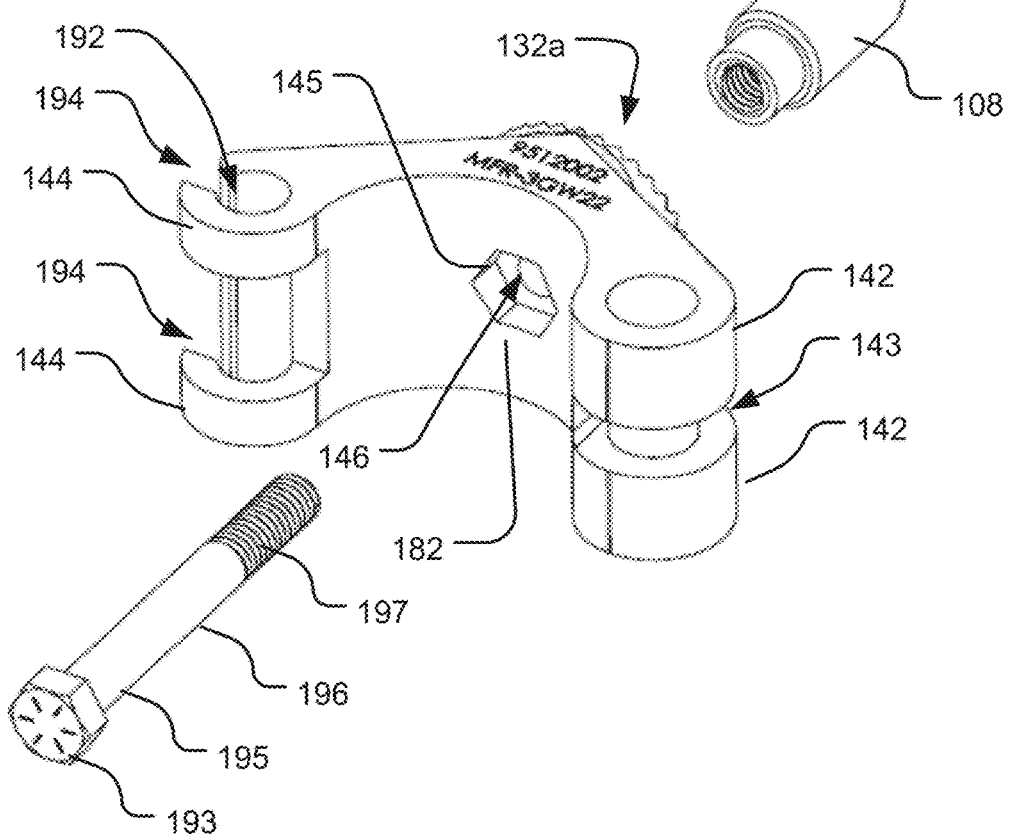
FIG. 11 is a rear isometric view of an alternate example of a fixed jaw of a clamp assembly.

FIG. 11 shows an alternate embodiment of a fixed jaw 132a. In this embodiment, the inside face 182 may also include a countersink 145. In this example, the countersink 145 may be sized to mate with the shaped head of an alternative pintle lever rod 196 used in place of pintle lever rod 110. For example, the pintle lever rod 196 may be a hex bolt with a hexagonal head 193 and an intermediate shaft length that is smooth rather than threaded. The hex head 193 may key within the countersink 145 formed as a corresponding hexagonal recess. In this example, the bore hole 146 is not threaded so that the smooth section 195 of the alternative pintle lever rod 196 may extend through the bore hole 146. A threaded section 197 of the alternative pintle lever rod 196 may be screwed into to the pintle lever handle 108. Thread lock or other adhesive, chemical welding, ultrasonic welding, metal welding, or other methods may be used to fix the pintle lever rod 196 within and with respect to the pintle lever handle 108.

Figure 12:
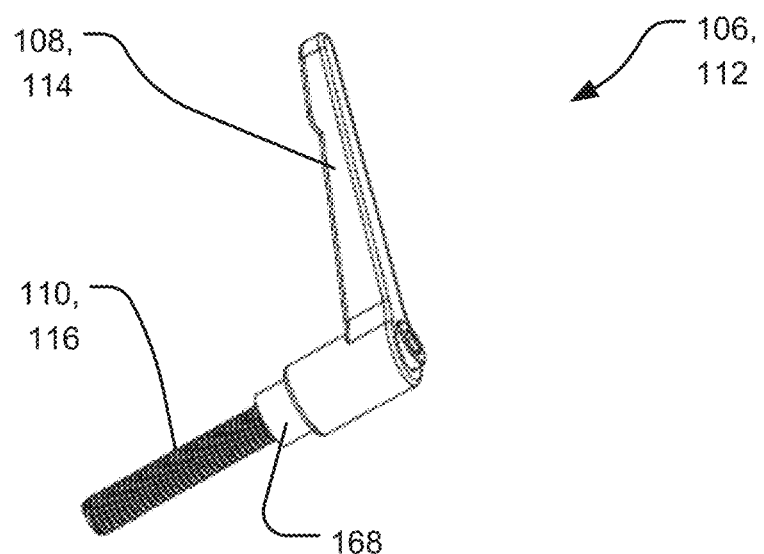
FIG. 12 is an isometric view of a lever.
Figure 13:
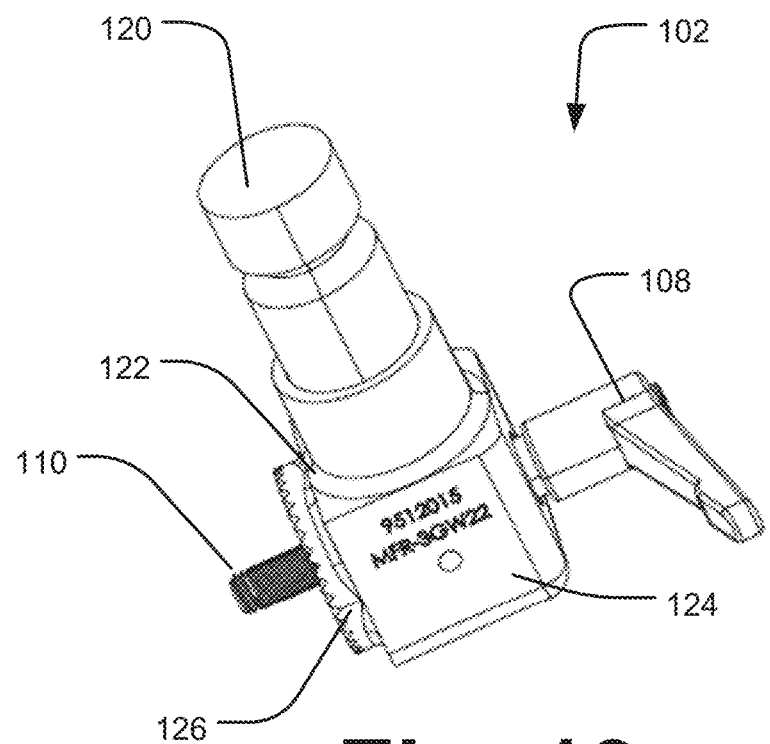
FIG. 13 is rear isometric view a pintle assembly of the apparatus of FIG. 1.

FIG. 12 depicts an example lever that may be used as the clamp lever 112 and pintle lever 106. The lever may have a handle such as pintle lever handle 108 or clamp lever handle 114 that is coupled to a rod such as the pintle lever rod 110 or the clamp lever rod 116. In some examples, the rod is threadably engaged with the handle. In some examples, the rod is permanently attached or coupled to the handle. In some examples, the rod is at least partially threaded and does not taper. In some examples, the free end of the clamp lever rod 116 interfaces with pivotable fastener, for example, a barrel nut 118, seated within the hinge aperture 190. A threaded bore 202 may extend through the body of the barrel nut 118 transverse to a longitudinal axis thereof (i.e., along a diameter). In some examples, the threaded bore 202 receives the clamp lever pin 118, which may be screwed within the threaded bore 202 of the barrel nut 118.

The apparatus 100 may also include grip pads 166. As shown in FIGS. 5 and 6, the pads 166 may affixed to the inside face 182 (see FIG. 10) of the fixed jaw 132 and to the inside face 170 of the moveable jaw 148, respectively. In use, the pads 166 may be used to cushion and provide friction for the coupling of the clamp assembly 104 to the support structure. For example, if the support structure is a tubular frame of a vehicle, the pads 166 may help protect the support structure from damage, such as nicks, abrasions, scratches, or the like, that may be caused when the clamp assembly 104 is coupled to the support structure. The pads 166 may also provide greater friction between the clamp assembly 104 and the structure to prevent relative movement therebetween. The pads 166 may further help shim and align the clamp assembly 104 to the support structure if the support structure has as roughened or unsmooth surface.

The details of the assembly of the apparatus 100 will now be described. The assembled clamp assembly 104 is shown in FIG. 7. The fixed jaw 132 and moveable jaw 148 are reversibly coupled together. To reversibly couple the fixed jaw 132 and the moveable jaw 148 together, the tab 180 (see FIG. 8) of the moveable jaw 148 is aligned with the slots 194 (see FIG. 9) of each of the knuckles 144 of the fixed jaw 132. After the tab 180 is aligned, the pin 154 of the moveable jaw 148 slides into the knuckle apertures 192 of the knuckles 144 of the fixed jaw 132 from above or below. The tab 180 is then aligned with the gap 200 (see FIGS. 9 and 10) formed between the knuckles 144 and the moveable jaw 148 may be rotated with respect to the fixed jaw 132 so the pin 154 of the moveable jaw 148 is rotatably coupled to the knuckles 144 of the fixed jaw 132.

The clamp lever 112 may then be rotatably coupled to the first end 134 of the fixed jaw 132. The barrel nut 118 may be positioned within each of the hinge apertures 190 of the hinge bosses 142 so that the threaded bore 202 is positioned in the gap 143 between the inside edges of the hinge bosses 142. The clamp lever rod 116 may then be screwed into the threaded bore 202 of the barrel nut 118. The barrel nut 118 may thus be both retained and rotated within the hinge apertures 190. Once the clamp lever rod 116 is coupled to the barrel nut 118, the clamp lever 112 is rotatably connected to the fixed jaw 132. The pads 166 may then be secured to the inside face 182 of the fixed jaw 132 and the inside face 170 of the moveable jaw 148. The moveable jaw 148 may then be rotated so that the clamp lever rod 116 is positioned within the slot 176 (see FIG. 8) of the moveable jaw 148. The clamp lever handle 114 may then be rotated to tighten the clamp lever rod 116 within the barrel nut 118 and thereby compress the clamp lever handle 114 and the first end 150 of the moveable jaw 148 against the hinge bosses 142 or, alternatively, loosen the clamp lever rod 116 and release the so that the clamp lever handle 114 is positioned against. Thus, the first end 134 of the fixed jaw 132 is releasably coupled with the first end 150 of the moveable jaw 148 by way of the clamp lever 112.

In some examples, the fixed jaw 132 and moveable jaw 148 of the clamp assembly 104 may be positioned about the support structure, and the moveable jaw 148 is then rotated so that the clamp lever rod 116 of the clamp lever 112 may be positioned within the slot 176. The clamp lever handle 114 is then rotated, causing the clamp lever rod 116 to screw into the barrel nut 118. This causes the clamp lever handle 114 to push against the first end 150 of the moveable jaw 148 and pivot the moveable jaw 148 towards the fixed jaw 132. In some examples, an object, such as a support structure, positioned between the inside face 182 of the fixed jaw 132 and the inside face 170 of the moveable jaw 148 is engaged between the fixed jaw 132 and the moveable jaw 148 and the clamp assembly 104 is thus secured about the object.

In some examples, the pintle 120 is secured to the slide block 122 within the socket 160. The pintle 120 may be secured using a permanent attachment or coupling method, such as welding or force-fit, or a semi-permanent attachment or coupling method, such as using an adhesive.

The pintle assembly 102 may then be assembled to the clamp assembly 104. In some examples, the pintle lever rod 110 is inserted through the bore hole 128 of the slide block 122 and rotatably received into the bore hole 146 of the fixed jaw 132. The pintle lever 106 is rotatably coupled to (i.e., screwed into) the fixed jaw 132 of the clamp assembly 104. In this position, the slide block 122 may freely rotate about the pintle lever rod 110 and its position may be linearly adjusted along the pintle lever rod 110 between the pintle lever handle 108 and the fixed jaw 132. In some examples, the slide block 122 may slide along and be adjusted about the pintle lever rod 110.

The slide block 122 may be then be rotated so that the pintle 120 is located in a desired position. The slide block 122 may slide toward the fixed jaw 132 and the splined face 126 of the slide block 122 may engage the splined face 162 of the fixed jaw 132. When the splined faces 126, 162 engage with each other, the slide block 122 may be prevented from rotating with respect to the fixed jaw 132.

The pintle lever handle 108 may then be rotated so that the pintle lever rod 110 passing through the bore hole 128 of the slide block 122 screws into the bore hole 146 of the fixed jaw 132 of the clamp assembly 104. Eventually, the pintle lever handle 108 may be rotated so that the slide block 122 is compressed between the pintle lever handle 108 and the fixed jaw 132. This compression helps secure the slide block 122 against the fixed jaw 132 in a secured position. The interface between the spline faces 126, 162 further prevents rotation between the slide block 122 and the fixed jaw 132.

In use, the apparatus 100 may be selectively mounted to a support structure. The pintle assembly 102 and the clamp assembly 104 may be rotatably and releasably coupled to each other at the splined face 126 of the slide block 122 and the splined face 162 of the fixed jaw 132.

In use, the clamp assembly 104 may be positioned about the support structure and the clamp lever 112 may be rotatably engaged to compress the support structure between the fixed jaw 132 and the moveable jaw 148. When in an unsecured position, the engagement of the pintle lever rod 110 with the slide block 122 may allow the slide block 122 to move freely between the pintle lever handle 108 and the fixed jaw 132. In the unsecured position, the slide block 122 and fixed jaw 132 may be rotated with respect to each other. In the unsecured position, the slide block 122 may be linearly adjusted toward and away from the fixed jaw 132.

In use, the pintle lever 106 may be rotated so that the slide block 122 is in a secured position, where the slide block 122 is compressed between the pintle lever handle 108 and the fixed jaw 132 of the clamp assembly 104. The compression of the slide block 122 engages the splined face 126 of the slide block 122 with the splined face 162 of the fixed jaw 132 and prevents the slide block 122 from rotating with respect to the fixed jaw 132 of the clamp assembly 104. The pintle 120 may then mate with a feature of a weapon to releasably couple the pintle 120 with the weapon.

In some implementations, a method of preparing to secure a weapon to a support structure includes engaging a clamp assembly to the support structure; moving a clamp lever to couple a moveable jaw of the clamp assembly to a fixed jaw of the clamp assembly; securing the clamp assembly to the support structure; positioning a slide block of a pintle assembly in an unsecured position; rotating a pintle lever handle of the pintle assembly; and securing the slide block of the pintle assembly to the fixed jaw of the clamp assembly in a secured position.

The method may also include securing a weapon to the pintle of the pintle assembly. The method may also include rotating the moveable jaw with respect to the fixed jaw before engaging the clamp assembly to the support structure. The step of moving a clamp lever may include rotating a clamp lever having a handle, rod, and pin, the pin being coupled to the fixed jaw. The step of moving a clamp lever may include positioning the clamp lever rod within a slot formed in the moveable jaw. The step of securing the clamp assembly may include rotating a handle of a clamp lever and compressing the fixed jaw and the moveable jaw together about the object. The step of securing the slide block of the pintle assembly to the fixed jaw of the clamp assembly may include engaging a splined face of the slide block with a splined face of the fixed jaw. The step of securing the slide block may include compressing the slide block between the pintle lever handle and the fixed jaw.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present devices, systems, and structures described herein, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions; order and relative sizes reflected in the drawings attached hereto may vary.

The above specification, examples and data provide a complete description of the structure and use of exemplary embodiments as defined in the claims. Although various embodiments of the claimed disclosure have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. An apparatus for mounting a weapon to a support structure, the apparatus comprising
   a pintle assembly configured to releasably couple the apparatus with the weapon, the pintle assembly including
      a slide block;
      a pintle coupled to the slide block;
      a pintle lever with a handle and a rod rotatably coupled to the slide block; and
   a clamp assembly configured to releasably couple the apparatus to the support structure, the clamp assembly including
      a fixed jaw having a first end, a central section, and a second end, the second end forming at least one knuckle;
      a moveable jaw having a first end and a second end, the second end forming a pin; and
      a clamp lever that releasably couples the first end of the fixed jaw with the first end of the moveable jaw; wherein
   the pin of the moveable jaw is rotatably coupled to the at least one knuckle of the fixed jaw;
   the pintle lever is rotatably coupled to the fixed jaw of the clamp assembly; and
   the pintle assembly and the clamp assembly are rotatably and releasably coupled to each other.

2. The apparatus of claim 1, wherein the clamp lever is pivotably coupled to the first end of the fixed jaw.

3. The apparatus of claim 1, wherein the clamp lever comprises a clamp lever handle, a rod, and a fastener engaged with the rod, wherein the fastener is pivotably coupled with the first end of the fixed jaw.

4. The apparatus of claim 1, wherein the first end of the fixed jaw comprises at least one hinge boss configured to pivotably couple with a fastener of the clamp lever handle.

5. The apparatus of claim 1, wherein the central section of the fixed jaw of the clamp assembly further comprises an engagement section that is complementary in shape to a feature of the slide block of the pintle assembly.

6. The apparatus of claim 1, wherein
   the fixed jaw of the clamp assembly further comprises a first splined face;
   the slide block further comprises a second splined face configured to engage with the first splined face of the fixed jaw; wherein
   rotation of the slide block with respect to the clamp assembly is restricted when the clamp assembly is assembled with the slide block in a secured position.

7. The apparatus of claim 1, wherein
   the fixed jaw of the clamp assembly further comprises a bore hole extending through the central section: and
   a portion of the rod of the pintle lever extends through the bore hole.

8. The apparatus of claim 7, wherein the portion of the rod of the pintle lever that extends through the bore hole of the fixed jaw is threaded.

9. The apparatus of claim 8, wherein when the pintle assembly is in a secured position, the engagement of the pintle lever rod with the slide block compresses the slide block between the pintle lever handle and the fixed jaw.

10. The apparatus of claim 8, wherein when the pintle assembly is in an unsecured position, the engagement of the pintle lever rod with the slide block allows the slide block to move freely between the pintle lever handle and the fixed jaw.

11. The apparatus of claim 10, wherein when in the unsecured position, the slide block and the fixed jaw may be rotated with respect to each other.

12. The apparatus of claim 10, wherein when in the unsecured position, the slide block may be linearly adjusted toward and away from the fixed jaw.

13. The apparatus of claim 6, wherein the splined face of the fixed jaw is generally normal to an axis of a bore hole extending through the central section of the fixed jaw.

14. The apparatus of claim 1, wherein
the slide block further comprises a bore hole extending through a body of the slide block through which the rod of the pintle lever extends; and
the slide block lever is adjustably and slidably positioned about the rod of the pintle lever.

15. An apparatus for mounting a weapon to a vehicle, the apparatus comprising
a pintle assembly configured to releasably couple the apparatus with the weapon, the pintle assembly including
slide block have a first splined face;
a pintle lever with a handle and a rod coupled to the slide block; and
a pintle coupled to the slide block;
a clamp assembly configured to releasably couple the apparatus to the vehicle, the clamp assembly including
a fixed jaw having at least one knuckle and a second splined face; and
a moveable jaw having a pin; wherein
the pin of the moveable jaw is pivotably coupled to the at least one knuckle of the fixed jaw;
an end of the moveable jaw opposite from the pin is configured to fasten to a facing end of the fixed jaw opposite from the at least one knuckle; and
the pintle assembly and the clamp assembly are rotatably and releasably coupled to each other at an interface between the first splined face and the second splined face.

\* \* \* \* \*